United States Patent
Tsuchida et al.

(10) Patent No.: US 12,091,512 B2
(45) Date of Patent: Sep. 17, 2024

(54) ORGANOPOLYSILOXANE AND COATING COMPOSITION CONTAINING ORGANOPOLYSILOXANE

(71) Applicant: SHIN-ETSU CHEMICAL CO., LTD., Tokyo (JP)

(72) Inventors: Kazuhiro Tsuchida, Annaka (JP); Tetsuro Yamada, Annaka (JP); Shigeki Yasuda, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 135 days.

(21) Appl. No.: 17/714,440

(22) Filed: Apr. 6, 2022

(65) Prior Publication Data

US 2022/0340715 A1    Oct. 27, 2022

(30) Foreign Application Priority Data

Apr. 16, 2021 (JP) ................. 2021-069695

(51) Int. Cl.
| | |
|---|---|
| *C08G 77/08* | (2006.01) |
| *C08G 77/18* | (2006.01) |
| *C09D 183/06* | (2006.01) |
| *B01J 31/02* | (2006.01) |
| *C08G 77/38* | (2006.01) |
| *C08G 77/42* | (2006.01) |

(52) U.S. Cl.
CPC ........... *C08G 77/18* (2013.01); *C09D 183/06* (2013.01); *B01J 31/0237* (2013.01); *C08G 77/38* (2013.01); *C08G 77/42* (2013.01); *C08G 2150/00* (2013.01)

(58) Field of Classification Search
CPC ........ C08G 77/18; C08G 77/50; C08G 77/38; C08G 77/42
USPC .................................................... 528/31, 15
See application file for complete search history.

(56) References Cited

U.S. PATENT DOCUMENTS

| | | | |
|---|---|---|---|
| 5,464,901 A | 11/1995 | Yoshikawa et al. | |
| 2004/0181025 A1* | 9/2004 | Schindler | ............... C08K 5/54 528/38 |
| 2006/0210506 A1 | 9/2006 | Kamei et al. | |
| 2016/0137872 A1* | 5/2016 | Miyafuji | ............... C08L 71/02 524/506 |
| 2019/0177542 A1* | 6/2019 | Uta | ............... C08L 83/04 |
| 2022/0396670 A1* | 12/2022 | Yamada | ............... C08G 77/18 |

FOREIGN PATENT DOCUMENTS

| | | | |
|---|---|---|---|
| EP | 3954747 | * | 2/2022 |
| JP | 6-271650 A | | 9/1994 |
| WO | WO 2004/091562 A1 | | 10/2004 |
| WO | 2020 209083 | * | 10/2020 |

OTHER PUBLICATIONS

Zhu et al., "Toughening of Rigid Silicone Resins", Polymeric Materials Science and Engineering, 1998, vol. 79, pp. 192-193. Total 3 pages.

* cited by examiner

*Primary Examiner* — Margaret G Moore
(74) *Attorney, Agent, or Firm* — Birch, Stewart, Kolasch & Birch, LLP

(57) ABSTRACT

Disclosed is an organopolysiloxane having a constituent unit represented by a general formula (1), a constituent unit represented by a general formula (2), and a group represented by a general formula (3) that is directly bonded to a silicon atom.

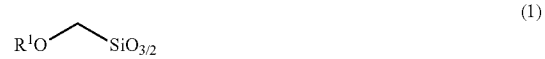

(1)

$R^1$ represents an alkyl group or an aryl group.

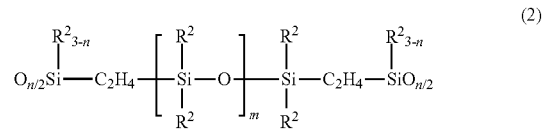

(2)

$R^2$ each independently represents an alkyl group or an aryl group, n is each independently 2 or 3, and m is an integer of 5 to 100.

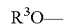

—    (3)

$R^3$ represents a hydrogen atom, an alkyl group, or an aryl group.

1 Claim, No Drawings

ORGANOPOLYSILOXANE AND COATING COMPOSITION CONTAINING ORGANOPOLYSILOXANE

CROSS-REFERENCE TO RELATED APPLICATION

This non-provisional application claims priority under 35 U.S.C. § 119(a) on Patent Application No. 2021-069695 filed in Japan on Apr. 16, 2021, the entire contents of which are hereby incorporated by reference.

TECHNICAL FIELD

The present invention relates to an organopolysiloxane and a coating composition containing the organopolysiloxane, and in more detail, relates to an organopolysiloxane, having a specific constituent unit and an alkoxysilyl group and/or a silanol group in one molecule, and a coating composition using the organopolysiloxane.

BACKGROUND ART

Silicone resins are currently widely used in various fields because of their superior properties in respect of water repellency, heat resistance, weatherability, freeze resistance, electrical insulation properties, chemical resistance and safety to the human body.

Particularly, organopolysiloxane having a three-dimensional cross-linked structure composed chiefly of $SiO_{4/2}$ units (Q units) and $RSiO_{3/2}$ units (T units) (R is an organic group such as an alkyl group or a phenyl group) is called a silicone resin or a silicone alkoxy oligomer, and is widely used in coating materials, coating agent applications, binder applications, and the like, using their curability.

In particular, a liquid silicone alkoxy oligomer having an alkoxysilyl group as a cross-linking group is utilized as a main agent of a solvent-free type coating material which is combustible and does not contain any organic solvent harmful to the human body (Non-Patent Document 1).

Since the alkoxysilyl group undergoes hydrolysis and dehydration condensation crosslinking reaction at room temperature due to moisture in the air, the alkoxysilyl group of the silicone alkoxy oligomer containing an alkoxysilyl group can react at room temperature to form a siloxane network by blending a curing catalyst. Such a polysiloxane cured film is excellent in heat resistance and weather resistance, and thus is used in a wide range of fields from outdoor buildings to electronic components.

In addition, the silicone alkoxy oligomer can promote the reaction by heating although the curing reaction proceeds even at room temperature as described above, and it can be said that the silicone alkoxy oligomer is a technique having excellent coating adaptability by appropriately introducing a heat curing step depending on the application.

However, the silicone resin or the silicone alkoxy oligomer as described above has advantages such as good curability and high surface hardness because of its three-dimensional cross-linked structure, but has problems such as insufficient flexibility and bending resistance due to its high cross-linked density, and occurrence of cracks in a coating film over time after film formation or when external stress is applied.

In order to improve this flexibility and bending resistance, a method has been employed in which a diorganosiloxane ($R_2SiO_{2/2}$) unit (D unit) is incorporated by using a diorganoxy alkoxysilane in combination at the time of synthesis by hydrolysis condensation of a silicone resin or a silicone alkoxy oligomer. However, in this case, since the D unit is randomly incorporated in the structure, it is necessary to add many D units in order to impart flexibility, and there is a problem that excellent curability and surface hardness, which are advantages of the silicone resin, are deteriorated.

Although a method of adding silicone oil in which molecular terminals are capped with TEOS ($Si(OCH_2CH_3)_4$) has also been proposed (Non-Patent Document 1), compatibility with the silicone resin and the silicone alkoxy oligomer is poor, which causes milkiness or repellency of coating films.

Another method of introducing the D unit into the silicone alkoxy oligomer includes a method of chemically bonding a hydrosilyl group and an alkyl olefin with a platinum catalyst or the like.

This reaction is generally called a hydrosilylation reaction, and it is known that an alkoxysilyl group can be introduced into a linear silicone by a silylethylene structure by using this reaction (Patent Documents 1 and 2).

Patent Document 1 discloses an organopolysiloxane containing both a silicone alkoxy oligomer structure having an alkoxysilyl group in one molecule and a structure derived from a silicone oil structure having a side chain methyl/phenyl type, obtained by subjecting a silicone oil compound containing a hydrosilyl group and having a chain structure of D units and a silicone alkoxy oligomer compound having both an olefin and an alkoxysilyl group in a side chain to a hydrosilylation reaction.

Since the organopolysiloxane of Patent Document 1 has a relatively long-chain and high-molecular-weight side-chain methyl/phenyl-type silicone oil structure, the organopolysiloxane exhibits an effect when added as a crack resistance imparting agent; however, when the organopolysiloxane is cured alone, the organopolysiloxane has insufficient hardness, and it is difficult to use the organopolysiloxane alone for coating material and coating agent applications.

The technique of Patent Document 2 is a technique that focuses on improving the feel by a linear silicone such as a hair treatment agent, and Patent Document 2 does not mention application as a flexible coating material.

In the silicone alkoxy oligomer in which the D unit is introduced by hydrosilylation as described above, since the D unit is locally introduced as compared with the random hydrolysis condensation method described above, properties of diorganopolysiloxane are easily exhibited; however, hydrolyzability of an alkoxysilyl moiety is lowered in the same manner, and improvement of reactivity (moisture curability) is required.

In addition, in order to ensure sufficient reactivity (moisture curability) at room temperature, it is generally essential to add a catalyst such as an organometallic compound, and in particular, addition of an organotin-based compound is particularly effective. However, the organotin-based compound usually used as a catalyst has concerns about toxicity to the human body and the environment, and in recent years, environmental regulations have become strict, and the use thereof has been avoided.

In addition, when organometallic catalysts such as organotin-based compounds are added in room temperature curable compositions of dealcoholization type, there arises the problem of poor storage stability that a siloxane bond in a main chain is cleaved (cracked) by the generated alcohol so that curability deteriorates or viscosity builds up with the lapse of time.

CITATION LIST

Patent Document 1: JP-A H06-271650
Patent Document 2: WO 2004/091562

Non-Patent Document 1: Polymeric Materials Science and Engineering, 1998, Vol. 79, 192

SUMMARY OF THE INVENTION

The present invention has been made in view of the above circumstances, and an object of the present invention is to provide an organopolysiloxane that achieves both hardness and bending resistance, provides a cured product having excellent decontamination properties such as hydrophobicity and waterdrop slippage capability, and provides a coating composition having good rapid curability and excellent safety even when an amine-based compound is used as a curing catalyst.

As a result of intensive studies to solve the above problems, the present inventors have found that an organopolysiloxane having an alkoxy-methylene-silicon bond as a specific constituent unit in one molecule, having an alkoxysilyl group and/or a silanol group, and further having a D unit introduced as a block segment via a silethylene bond provides a cured product excellent in fast curability and capable of satisfying hardness, bending resistance, and hydrophobicity/lubricity in a high dimension even when an amine-based compound is used as a curing catalyst instead of an organotin compound, have found that a composition containing this compound is suitable as a curable composition that forms a material such as a coating agent, and have completed the present invention.

The present invention provides:
1. An organopolysiloxane having a constituent unit having the following general formula (1), a constituent unit having the following general formula. (2), and a group having the following general formula (3) that is directly bonded to a silicon atom,

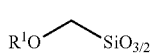
(1)

wherein $R^1$ represents an unsubstituted or substituted alkyl group having 1 to 12 carbon atoms or an unsubstituted or substituted aryl group having 6 to 10 carbon atoms,

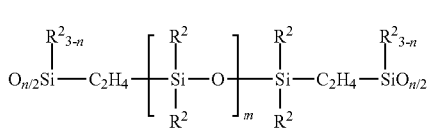
(2)

wherein $R^2$ each independently represents an unsubstituted or substituted alkyl group having 1 to 12 carbon atoms or an unsubstituted or substituted aryl group having 6 to 10 carbon atoms, n is each independently 2 or 3, and m is an integer of 5 to 100, $R^3O—$ (3)

wherein $R^3$ represents a hydrogen atom, an unsubstituted or substituted alkyl group having 1 to 10 carbon atoms, or an unsubstituted or substituted aryl group having 6 to 10 carbon atoms;
2. The organopolysiloxane according to 1, wherein an average structure is having the following formula (4):

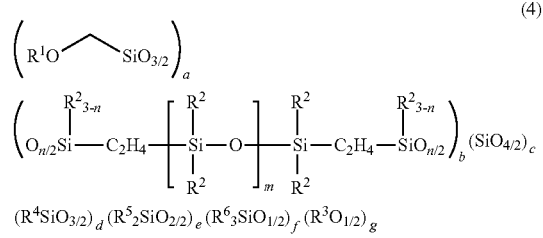
(4)

$(R^4SiO_{3/2})_d (R^5_2SiO_{2/2})_e (R^6_3SiO_{1/2})_f (R^3O_{1/2})_g$ wherein $R^1$, $R^2$, $R^3$, n and m represent the same meaning as described above, $R^4$, $R^5$ and $R^6$ each independently represent a monovalent organic group, and a, b, c, d, e, f and g represent the number of a>0, b>0, c≥0, d≥0, e≥0, f≥0, and g>0;
3. The organopolysiloxane according to 1 or 2, wherein an average structure is having the following formula (5),

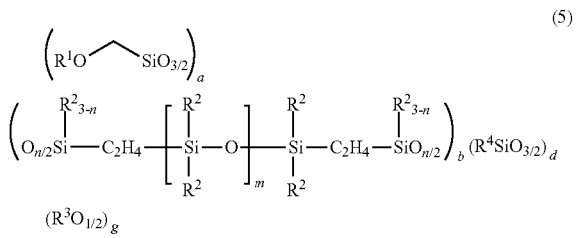
(5)

$(R^3O_{1/2})_g$ wherein $R^1$, $R^2$, $R^3$, $R^4$, n, m, a, b, and g represent the same meaning as described above, and d represents the number of d>0;
4. A method of producing the organopolysiloxane according to any one of 1 to 3, the method including hydrosilylating a vinyl group-containing organopolysiloxane, obtained by copolymerizing a trialkoxysilane having the following general formula (6) and a vinyl alkoxysilane having the following general formula (7) by hydrolysis and condensation, and an organohydrogen polysiloxane having the following general formula (8):

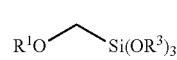
(6)

wherein $R^1$ and $R^3$ represent the same meaning as described above

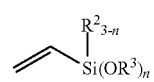
(7)

wherein $R^2$, $R^3$ and n represent the same meaning as described above

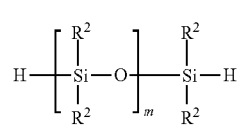
(8)

wherein $R^2$ and m represent the same meaning as described above;
5. A curable composition containing (A) the organopolysiloxane according to any one of 1 to 3 and (B) a curing catalyst;
6. The curable composition according to 5, wherein (B) the curing catalyst is an amine-based compound;
7. A cured product obtained by curing the curable composition according to 5 or 6;
8. A coating agent composition containing (A) the organopolysiloxane according to any one of 1 to 3 and (B) a curing catalyst;
9. The coating agent composition according to 8, wherein (B) the curing catalyst is an amine-based compound, and
10. An article including a coating layer formed by curing the coating agent composition according to 8 or 9.

Advantageous Effects of the Invention

The organopolysiloxane of the present invention has an alkoxy-methylene-silicon bond as a specific constituent unit in one molecule a dimethylsiloxy unit (D unit) is introduced as a polydimethylsiloxy structure into a polymer via a silethylene structure, and the organopolysiloxane has an alkoxysilyl group and/or a silanol group; therefore, the organopolysiloxane is excellent in flexibility as compared with conventional silicone resins and silicone alkoxy oligomers, and is also excellent in surface antifouling properties such as hydrophobicity and water slipping properties.

Furthermore, the organopolysiloxane of the present invention also has characteristics of providing a cured product that is excellent in rapid curability and can achieve both hardness and bending resistance even when an amine-based compound is used as a curing catalyst instead of an organotin compound.

The composition containing the organopolysiloxane of the present invention having such characteristics can be suitably used as a curable composition for forming a material such as a coating agent.

DESCRIPTION OF THE PREFERRED EMBODIMENT

Hereinafter, the present invention will be specifically described.

The organopolysiloxane according to the present invention has a constituent unit represented by the following general formula (1), a constituent unit represented by the following general formula (2) and a group represented by the following general formula (3) that is directly bonded to a silicon atom.

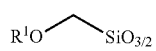
(1)

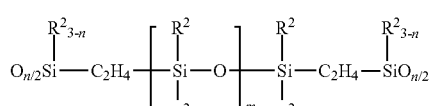
(2)

(3)

Here, $R^1$ represents an unsubstituted or substituted alkyl group having 1 to 12 carbon atoms, preferably 1 to 3 carbon atoms, or an unsubstituted or substituted aryl group having 6 to 10 carbon atoms.

The alkyl group having 1 to 12 carbon atoms of $R^1$ may be linear, cyclic, or branched, and is preferably a linear or branched alkyl group, and more preferably a linear alkyl group.

Specific examples thereof include methyl, ethyl, n-propyl, n-butyl, s-butyl, t-butyl, n-pentyl, n-hexyl, n-heptyl, n-octyl, n-nonyl, n-decyl, n-undecyl, and n-dodecyl groups, and methyl, ethyl, and t-butyl groups are preferable, methyl and ethyl groups are more preferable, and a methyl group is still more preferable.

Specific examples of the aryl group having 6 to 10 carbon atoms include a phenyl group and a naphthyl group, and a phenyl group is preferable.

In particular, $R^1$ is preferably an alkyl group having 1 to 3 carbon atoms from the viewpoint of curability and hardness.

The $R^1$ represents an unsubstituted or substituted alkyl group having 1 to 12 carbon atoms, preferably 1 to 3 carbon atoms, or an unsubstituted or substituted aryl group having 6 to 10 carbon atoms.

The alkyl group having 1 to 12 carbon atoms of $R^2$ may be linear, cyclic, or branched, and is preferably a linear or cyclic alkyl group, and more preferably a linear alkyl group.

Specific examples thereof include methyl, ethyl, n-propyl, n-butyl, s-butyl, t-butyl, n-pentyl, n-cyclopentyl, n-hexyl, n-cyclohexyl, n-heptyl, n-octyl, n-nonyl, n-decyl, n-undecyl, and n-dodecyl groups, and methyl and ethyl groups are preferable, and a methyl group is more preferable.

Specific examples of the aryl group having 6 to 10 carbon atoms include a phenyl group and a naphthyl group, and a phenyl group is preferable.

In particular, from the viewpoint of imparting flexibility, hydrophobicity, and water slipping properties, $R^2$ is preferably an alkyl group having 1 to 3 carbon atoms.

The n corresponds to a siloxane resin or an introduction unit into an oligomer main structure, examples thereof include 2 and 3, and 2 is preferable.

The m is the number of units of a dimethylpolysiloxane chain, examples thereof include 5 to 100, 10 to 90 are preferable, and 20 to 60 are more preferable. When m is more than 100, there is a problem that reactivity with a vinylsiloxane moiety of a main chain deteriorates in the hydrosilylation reaction described later.

The $R^3$ represents a hydrogen atom, an unsubstituted or substituted alkyl group having 1 to 10 carbon atoms, or an unsubstituted or substituted aryl group having 6 to 10 carbon atoms.

The alkyl group having 1 to 10 carbon atoms of $R^3$ may be linear, cyclic, or branched, and is more preferably a linear alkyl group. Specific examples thereof include methyl, ethyl, n-propyl, n-butyl, n-pentyl, n-hexyl, n-heptyl, n-octyl, n-nonyl, and n-decyl, and methyl, ethyl, and methyl, ethyl, n-propyl, n-hexyl, and n-octyl groups are preferable, methyl and ethyl groups are more preferable, and a methyl group is still more preferable.

Specific examples of the aryl group having 6 to 10 carbon atoms include a phenyl group and a naphthyl group, and a phenyl group is preferable.

In particular, from the viewpoint of curability, $R^3$ is preferably a hydrogen atom or an alkyl group having 1 to 3 carbon atoms, and more preferably a hydrogen atom, a methyl group, or an ethyl group.

Some or all of the hydrogen atoms of the alkyl group or aryl group of the $R^1$, $R^2$, and $R^3$ may be substituted with a halogen atom such as F, Cl, or Br, or another substituent such as a cyano group, and specific examples of such a group include a halogen-substituted alkyl group such as a 3,3,3-trifluoropropyl group; and a cyano substituted alkyl group such as a 2-cyanoethyl group.

The organopolysiloxane of the present invention is not particularly limited as long as it has the constituent unit represented by the general formula (1), the constituent unit represented by the general formula (2), and the group represented by the general formula (3) directly bonded to a silicon atom, and the organopolysiloxane may have a linear structure, a branched structure, or a crosslinked structure composed of an organopolysiloxane backbone therein.

More specifically, the organopolysiloxane of the present invention preferably has an average structure represented by the following formula (4), and by using such an organopolysiloxane, even better rapid curability, hardness, bending resistance, hydrophobicity, and water slipping properties are exhibited.

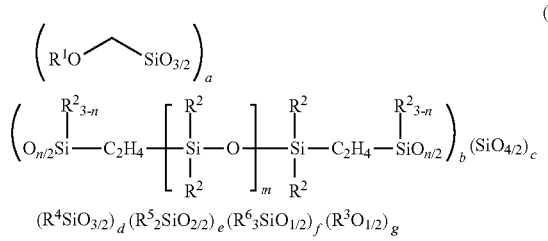

(4)

wherein, $R^1$, $R^2$, $R^3$, n and m represent the same meaning as described above.

Here, $R^4$, $R^5$, and $R^6$ each independently represent a monovalent organic group.

The monovalent organic group is not particularly limited, and examples thereof include the alkyl group having 1 to 12 carbon atoms and the aryl group having 6 to 10 carbon atoms exemplified for $R^1$ in the general formula (1).

Some or all of the hydrogen atoms of these alkyl groups and aryl groups may be substituted with a substituent, and examples of such a substituent include a halogen atom, a polyether group such as an alkenyl group such as a vinyl group, a glycidyl epoxy group, an alicyclic epoxy group, a thiirane group, a (meth)acryloyloxy group, a mercapto group, an iso (thio)cyanate group, a succinic anhydride group, an amino group, an ethylene diamino group, a perfluoroalkyl group, and a polyoxyethylene group, and a perfluoropolyether group.

$R^4$, $R^5$, and $R^6$ may be two or more different monovalent organic groups, and in that case, a content ratio of the two or more different monovalent organic groups is arbitrary, and is not particularly limited as long as a total value of the content ratios of the two or more different monovalent organic groups is 1.

For example, as $R^4$, an alkyl group is 0.5 and an aryl group is 0.5, and as $R^5$, an alkyl group is 0.2 and a glycidyl type epoxy group-containing alkyl group is 0.8. In this manner, it is possible to arbitrarily select from various monovalent organic groups described above, and it is possible to adopt an arbitrary content ratio.

Among them, $R^4$, $R^5$, and $R^6$ are preferably an alkyl group having 1 to 12 carbon atoms and no substituent, an aryl group having 6 to 10 carbon atoms and no substituent, a glycidyl epoxy group, a (meth)acrylic group, and a mercapto group, and more preferably an alkyl group having 1 to 12 carbon atoms and no substituent, from the viewpoint of fast curability, hardness, and bending resistance. More preferable examples thereof include a methyl group and a phenyl group from the viewpoint of feedability of a raw material.

a, b, c, d, e, f, and g represent the numbers of a>0, b>0, c≥0, d≥0, e≥0, f≥0, and g>0. From the viewpoint of fast curability, hardness, bending resistance, hydrophobicity, and water slipping properties, the numbers of 1000≥a>0, 1000≥b>0, 500≥c≥0, 1000≥d≥0, 1000≥e≥0, 100≥f≥0, and 1000≥g>0 are preferable, the numbers of 500≥a>0, 500≥b>0, 100≥c≥0, 500≥d≥0, 500≥e≥0, 50≥f≥0, and 500≥g>0 are more preferable, and the numbers of 500≥a>0, 500≥b>0, c=0, 500≥d>0, e=0, f=0, and 500≥g>0 is still more preferable.

Therefore, the organopolysiloxane of the present invention preferably has an average structure represented by the following formula (5), and by using such an organopolysiloxane, even better rapid curability, hardness, bending resistance, hydrophobicity, and water slipping properties are exhibited.

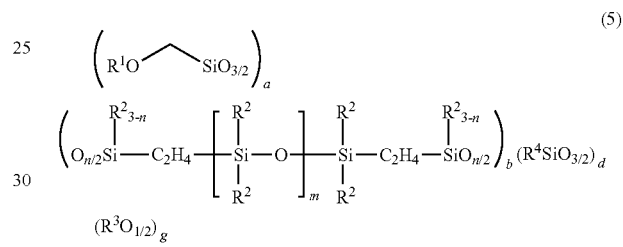

(5)

wherein, $R^1$, $R^2$, $R^3$, $R^4$, n, in a, b, and g represent the same meaning as described above, and d represents the number of d>0.

A weight average molecular weight of the organopolysiloxane of the present invention is not particularly limited, and is preferably 1,500 to 200,000, more preferably 5,000 to 100,000, and still more preferably 10,000 to 80,000 in consideration of imparting sufficient fast curability, hardness, bending resistance, hydrophobicity, and water slipping properties to a cured product obtained by curing a curable composition containing the compound. The weight average molecular weight in the present invention is a value in terms of polystyrene by gel permeation chromatography (GPC).

The organopolysiloxane of the present invention can be produced by copolymerizing a trialkoxysilane (hereinafter, referred to as trialkoxysilane (6)) represented by the following structural formula (6), a vinyl alkoxysilane (hereinafter, referred to as vinyl alkoxysilane (7)) represented by the following structural formula (7), and various alkoxysilanes (hereinafter, referred to as alkoxysilane (9), (10), (11) or (12), respectively) represented by the following structural formulas (9), (10), (11) and (12) and/or partial hydrolytic condensates thereof as optional components by hydrolysis and dehydration condensation to obtain a corresponding vinyl group-containing organopolysiloxane, and then subjecting the vinyl group-containing organopolysiloxane and an organohydrogen polysiloxane represented by the following structural formula (8) to a hydrosilylation reaction.

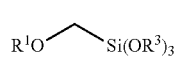

(6)

-continued

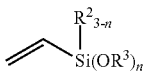 (7)

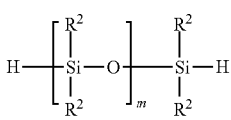 (8)

Si(OR³)₄ (9)

R⁴—Si(OR³)₃ (10)

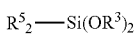 (11)

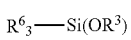 (12)

wherein, $R^1$ to $R^6$, n and m represent the same meaning as described above.

Specific examples of the trialkoxysilane (6) include methoxymethyltrimethoxysilane, ethoxymethyltriethoxysilane, methoxymethylmethyldimethoxysilane, ethoxymethylmethylmethyldiethoxysilane, methoxymethylethyldimethoxysilane, ethoxymethylethyldiethoxysilane, methoxymethylhexyldimethoxysilane, ethoxymethylhexyldiethoxysilane, methoxymethyloctyldimethoxysilane, ethoxymethyloctyldiethoxysilane, methoxymethylphenyldimethoxysilane, and ethoxymethylphenyldiethoxysilane, and in consideration of the fast curability, hardness, bending resistance, hydrophobicity, and water slipping properties of the organopolysiloxane to be obtained, methoxymethyltrimethoxysilane and ethoxymethyltriethoxysilane are preferable.

Specific examples of the trialkoxysilane (7) include vinyltrimethoxysilane, vinyltriethoxysilane, vinylmethyldimethoxysilane, vinylmethyldiethoxysilane, vinylethyldimethoxysilane, vinylethyldiethoxysilane, vinylhexyldimethoxysilane, vinylhexyldiethoxysilane, vinyloctyldimethoxysilane, vinyloctyldiethoxysilane, vinylphenyldimethoxysilane, and vinylphenyldiethoxysilane, and vinyltrimethoxysilane, vinyltriethoxysilane, and vinylmethyldimethoxysilane are preferable in consideration of the fast curability, hardness, bending resistance, hydrophobicity, and water slipping properties of the organopolysiloxane to be obtained, and the market circulation as a raw material.

Specific examples of the alkoxysilane (9) as an optional component include tetramethoxysilane, tetraethoxysilane, tetrapropoxysilane, tetraisopropoxysilane, tetrabutoxysilane, and tetraoctoxysilane.

Specific examples of the alkoxysilane (10) as an optional component include methyltrimethoxysilane, propyltrimethoxysilane, hexyltrimethoxysilane, octyltrimethoxysilane, decyltrimethoxysilane, phenyltrimethoxysilane, naphthyltrimethoxysilane, allyltrimethoxysilane, hexenyltrimethoxysilane, octenyltrimethoxysilane, methyltriethoxysilane, propyltriethoxysilane, hexyltriethoxysilane, octyltriethoxysilane, decyltriethoxysilane, phenyltriethoxysilane, naphthyltriethoxysilane, allyltriethoxysilane, hexenyltriethoxysilane, octenyltriethoxysilane, 2-(3,4-epoxycyclohexyl)ethyltrimethoxysilane, 2-(3,4-epoxycyclohexyl)ethyltriethoxysilane, 3-glycidoxypropyltrimethoxysilane, 3-glycidoxypropyltriethoxysilane, 8-glycidoxyoctyltrimethoxysilane, 8-glycidoxyoctyltriethoxysilane, p-styryltrimethoxysilane, p-styryltriethoxysilane, methacryloxymethyltrimethoxysilane, methacryloxymethyltriethoxysilane, 3-methacryloxypropyltrimethoxysilane, 3-methacryloxypropyltriethoxysilane, 8-methacryloxyocrtyltrimethoxysilane, 8-methacryloxyoctyltriethoxysilane, acryloxymethyltrimethoxysilane, acryloxymethyltriethoxysilane, 3-acryloxypropyltrimethoxysilane, 3-acryloxypropyltriethoxysilane, 8-acryloxyoctyltrimethoxysilane, 8-acryloxyoctyltriethoxysilane, N-2-(aminoethyl)-aminomethyltrimethoxysilane, N-2-(aminoethyl)-aminomethyltriethoxysilane, N-2-(aminoethyl)-3-aminopropyltrimethoxysilane, N-2-(aminoethyl)-3-aminopropyltriethoxysilane, N-2-(aminoethyl)-8-aminooctyltrimethoxysilane, N-2-(aminoethyl)-8-aminooctylmethoxysilane, aminomethyltrimethoxysilane, aminomethyltriethoxysilane, 3-aminopropyltrimethoxysilane, 3-aminopropyltriethoxysilane, 8-aminooctyltrimethoxysilane, 8-aminooctyltriethoxysilane, N-phenylaminomethyltrimethoxysilane, N-phenylaminomethyltriethoxysilane, N-phenyl-3-aminopropyltrimethoxysilane, N-phenyl-3-aminopropyltriethoxysilane, N-phenyl-8-aminooctyltrimethoxysilane, N-phenyl-8-aminooctyltriethoxysilane, 3-isocyanatopropyltrimethoxysilane, 3-isocyanatopropyltriethoxysilane, mercaptomethyltrimethoxysilane, mercaptomethyltriethoxysilane, 3-mercaptopropyltrimethoxysilane, 3-mercaptopropyltriethoxysilane, 8-mercaptooctyltrimethoxysilane, 8-mercaptooctyltriethoxysilane, 3-trimethoxysilylpropylsuccinic anhydride, 3-triethoxysilylpropylsuccinic anhydride, chloromethyltrimethoxysilane, chloromethyltriethoxysilane, 3-chloropropyltrimethoxysilane, 3-chloropropyltriethoxysilane, 8-chlorooctyltrimethoxysilane, 8-chlorooctyltriethoxysilane, trifluoropropyltrimethoxysilane, nonafluorohexyltrimethoxysilane, tridecafluorooctylmethoxysilane, polyethylene glycol m-ethyl-3-trimethoxysilylpropyl ether, polyethylene glycol methyl-3-triethoxysilylpropyl ether, polypropylene glycol methyl-3-trimethoxysilylpropyl ether, and polypropylene glycol methyl-3-triethoxysilylpropyl ether.

Among them, as the alkoxysilane (10), methyltrimethoxysilane, methyltriethoxysilane, phenyltrimethoxysilane, 3-glycidoxypropyltrimethoxysilane, 3-glycidoxypropyltriethoxysilane, 3-methacryloxypropyltrimethoxysilane, 3-acryloxypropyltrimethoxysilane, 3-mercaptopropyltrimethoxysilane, 3-mercaptopropyltriethoxysilane, nonafluorohexyltrimethoxysilane, tridecafluorooctyltrimethoxysilane, and polyethylene glycol methyl-3-trimethoxysilylpropyl ether are preferable, and methyltrimethoxysilane and methyltriethoxysilane are more preferable.

Specific examples of the alkoxysilane (11) as an optional component include dimethyldimethoxysilane, dimethyldiethoxysilane, methylphenyldimethoxysilane, methylphenyldiethoxysilane, diphenyldimethoxysilane, diphenyldiethoxysilane, octenylmethyldimethoxysilane, 2-(3,4-epoxycyclohexyl)ethylmethyldimethoxysilane, 3-glycidoxypropylmethyldimethoxysilane, 3-glycidoxypropylmethyldiethoxysilane, 3-methacryloxypropylmethyldimethoxysilane, 3-methacryloxypropylmethyldiethoxysilane, 3-acryloxypropylmethyldimethoxysilane, N-2-(aminoethyl)-3-aminopropylmethyldimethoxysilane, N-2-(aminoethyl)-3-aminopropylmethyldiethoxysilane, 3-aminopropylmethyldimethoxysilane, 3-aminopropylmethyldiethoxysilane, 3-mercaptopropylmethyldimethoxysilane, 3-mercaptopropylmethyldiethoxysilane, 3-chloropropylmethyldimethoxysilane, and 3-chloropropylmethyldiethoxysilane.

Among them, as the alkoxysilane (11), dimethyldimethoxysilane, dimethyl diethoxysilane, diphenyldimethoxysilane, 3-glycidoxypropylmethyldimethoxysilane, and 3-glycidoxypropylmethyldiethoxysilane are preferable, and dimethlydimethoxysilane and dimethyldiethoxysilane are more preferable.

Specific examples of the alkoxysilane (12) as an optional component include trimethylmethoxysilane, trimethylethoxysilane, vinyldimethylmethoxysilane, 3-methacryloxypropyldimethylmethoxysilane, 3-methacryloxypropyldimethylethoxysilane, 3-acryloxypropyldimethylmethoxysilane, 3-acryloxypropyldimethylethoxysilane, N-2-(aminoethyl)-3-aminopropyldimethylmethoxysilane, and N-2-(aminoethyl)-3-aminopropyldimethylethoxysilane, and trimethylmethoxysilane is preferable.

Specific examples of the organohydrogen polysiloxane (8) include organohydrogen polysiloxanes in which the number m of dimethylsiloxy units is 8, 20, 40, 60, or 90 on average. Among them, m is preferably 20 or 40 from the viewpoint of imparting hydrosilylation reactivity, developed hydrophobicity, water slipping properties, and flexibility of a coating film.

Although the copolymerization by hydrolysis and dehydration condensation of the trialkoxysilanes (6) and (7) with the alkoxysilanes (9) to (12) as an optional component is usually carried out without a solvent, the copolymerization may be carried out in the presence of an organic solvent (for example, methanol, ethanol, isopropyl alcohol, butanol, diacetone alcohol, propylene glycol monomethyl ether, propylene glycol monomethyl ether acetate, acetone, toluene, and xylene) that dissolves all the alkoxysilanes used in the reaction.

When an organic solvent is used, the amount thereof used is not particularly limited, and is usually preferably 20 parts by weight or less, more preferably 0.1 to 10 parts by weight, and still more preferably 0.5 to 5 parts by weight, per 1 part by weight of a total weight of the trialkoxysilanes (6) and (7) and the alkoxysilanes (9) to (12) as optional components.

Copolymerization by hydrolysis and dehydration condensation is performed by adding dropwise or feeding an acid or a base serving as a catalyst of the hydrolysis reaction and water to the above-described mixed solution or solution of alkoxysilane. At this time, the acid or base may be added dropwise in an aqueous solution.

The acid is not particularly limited, and examples of the acid include hydrochloric acid, sulfuric acid, nitric acid, acetic acid, formic acid, phosphoric acid, p-toluenesulfonic acid and hydrates thereof, methanesulfonic acid, trifluoromethanesulfonic acid, and a cation exchange resin. Hydrochloric acid, methanesulfonic acid, and a cation exchange resin are preferable, hydrochloric acid and a cation exchange resin are more preferable, and hydrochloric acid is still more preferable.

The amount of the acid to be used is usually preferably 0.001 to 1 mol, more preferably 0.01 to 0.2 mol, per 1 mol of the total number of moles of the trialkoxysilanes (6) and (7) and the alkoxysilanes (9) to (12) as optional components.

The base is not particularly limited, and examples of the base include sodium hydroxide, potassium hydroxide, lithium hydroxide, sodium acetate, potassium acetate, lithium acetate, sodium carbonate, sodium hydrogen carbonate, sodium methoxide, sodium ethoxide, potassium methoxide, potassium ethoxide, potassium tertiary butoxide, triethylamine, and an anion exchange resin. Sodium hydroxide, potassium hydroxide, and sodium acetate are preferable, and sodium acetate is more preferable.

The amount of the base to be used is usually preferably 0.001 to 1 mol, more preferably 0.01 to 0.2 mol, per 1 mol of the total number of moles of the trialkoxysilanes (6) and (7) and the alkoxysilanes (9) to (12) as optional components.

The amount of water used for copolymerization by hydrolysis and condensation is usually preferably 0.1 to 100 mol, more preferably 0.3 to 10 mol, and still more preferably 0.5 to 2.0 mol, per 1 mol of the total number of moles of the trialkoxysilanes (6) and (7) and the alkoxysilanes (9) to (12) as optional components.

The reaction temperature of the copolymerization by hydrolysis and dehydration condensation is not particularly limited, and is usually 20 to 150° C., preferably 30 to 120° C., more preferably 40 to 100° C., and still more preferably 50 to 80° C. The reaction time is usually 1 hour or more, and preferably 2 to 72 hours.

A concentration temperature of a reaction mixture is not particularly limited, and is usually 10 to 150° C., and preferably 60 to 120° C. The pressure during concentration is not particularly limited, and the concentration may be under normal pressure or under reduced pressure.

A stoichiometric ratio of the trialkoxysilanes (6) and (7) to the alkoxysilanes (9) to (12) as optional components is not particularly limited, and in consideration of the fast curability, hardness, and bending resistance of the organopolysiloxane to be obtained, the stoichiometric ratio is preferably 0.001 to 1,000 mol of the alkoxysilane (7), 0 to 1,000 mol of the alkoxysilane (9), 0 to 1,000 mol of the alkoxysilane (10), 0 to 1,000 mol of the alkoxysilane (11), and 0 to 1,000 mol of the alkoxysilane (12), per 1 mol of the trialkoxysilane (6), is more preferably 0.01 to 100 mol of the alkoxysilane (7), 0 to 100 mol of the alkoxysilane (9), 0.001 to 100 mol of the alkoxysilane (10), 0 to 100 mol of the alkoxysilane (11), 0 to 100 mol of the alkoxysilane (12) per 1 mol of the trialkoxysilane (6), and is still more preferably 0.1 to 50 mol of the alkoxysilane (7), 0 mol of the alkoxysilane (9), 0.001 to 50 mol of the alkoxysilane (10), 0 mol of the alkoxysilane (11), and 0 mol of the alkoxysilane (12) per 1 mol of the trialkoxysilane (6).

Therefore, the organopolysiloxane of the present invention is preferably a vinyl group-containing organopolysiloxane obtained by copolymerizing trialkoxysilanes (6) and (7) and alkoxysilane (10) by hydrolysis and dehydration condensation. By using a compound obtained by the reaction with the organohydrogen polysiloxane (8) by subsequent hydrosilylation, even better fast curability, hardness, bending resistance, hydrophobicity and water slipping properties are exhibited.

(6)

(7)

(10)

(8)

wherein. $R^1$ to $R^4$, n and in represent the same meaning as described above.

The hydrosilylation of the vinyl group-containing organopolysiloxane and the organohydrogen polysiloxane (8) can be performed in a solvent system or a solvent-free system in the presence of a platinum catalyst or a rhodium catalyst.

In a reaction ratio between the vinyl group-containing organopolysiloxane and the organohydrogen polysiloxane, the number of Si—H groups of the organohydrogen polysiloxane is preferably 0.1 to 2.0, more preferably 0.25 to 1.2 per 1 vinyl group of the vinyl group-containing organopolysiloxane. If the number is too small, unreacted vinyl group-containing organopolysiloxane may excessively remain, and if the number is too large, intermolecular crosslinking may excessively proceed to unnecessarily increase the molecular weight, leading to deterioration of stability of a product.

As a hydrosilylation reaction catalyst, a known catalyst such as platinum (Pt), a complex compound having Pt as a central metal, or a complex compound having rhodium as a central metal can be used. Specific examples thereof include an alcohol solution of chloroplatinic acid, a 1,3-divinyltetramethyldisiloxane complex of chloroplatinic acid, a compound obtained by neutralizing the complex, a 1,3-divinyltetramethyldisiloxane complex in which an oxidation number of a central metal is Pt (II) or Pt (0), and a Wilkinson catalyst of rhodium. Preferably, a complex in which the oxidation number of the central metal is other than Pt (IV) is preferable from the viewpoint of addition position selectivity, and particularly, a 1,3-divinyltetramethyldisiloxane complex having Pt (0) and Pt (II) as the central metal is preferable.

The amount of the hydrosilylation reaction catalyst used is not particularly limited as long as the catalytic effect of the hydrosilylation reaction is exhibited, and is preferably 0.000001 to 1 mol % and more preferably 0.0001 to 0.01 mol % per 1 mol of the vinyl group of (i). When the amount is less than 0.000001 mol %, a sufficient catalytic effect may not be exhibited, and when the amount is more than 1 mol %, the effect is saturated, so that the production cost may be increased and uneconomical.

The temperature during the hydrosilylation reaction is preferably 50 to 150° C., more preferably 60 to 130° C., and still more preferably 70 to 110° C. When the temperature is less than 50° C., a reaction rate is low, and production efficiency may be poor. When the temperature is more than 150° C., it is difficult to control the addition position, an additional isomer is generated, and in addition, a side reaction such as a dehydrogenation reaction derived from a hydrosilyl group may occur.

The reaction time is preferably 30 minutes to 10 hours.

In carrying out the hydrosilylation reaction, a, solvent may be used. The solvent is not particularly limited as long as it does not inhibit the reaction or have reactivity with the raw material, and examples of the solvent include alcohol-based solvents such as methanol, ethanol, and propanol; ether-based solvents such as diethyl ether, dimethoxyethane, and tetrahydrofuran; heteroelement-containing polar solvents such as acetonitrile and dimethylformamide; aliphatic hydrocarbon-based solvents such as hexane and heptane; and aromatic hydrocarbon-based solvents such as toluene and xylene. These solvents may be used singly or in combination of two or more kinds thereof.

A kinematic viscosity of the organopolysiloxane of the present invention at 25° C. is preferably 10 to 10,000 mm$^2$/s, and more preferably 30 to 5,000 mm$^2$/s. When the kinematic viscosity is lower than 10 mm$^2$/s, desired hydrophobicity and water slipping properties may not be exhibited. On the other hand, when the kinematic viscosity is higher than 10,000 mm$^2$/s, storage stability of the obtained polymer is low, and handling may be difficult.

The kinematic viscosity in the present invention is a measured value with a Cannon-Fenske viscometer measured by the method described in JIS Z 8803: 2011.

The curable composition and the coating agent composition (hereinafter, both are collectively referred to as a composition) of the present invention contain at least the organopolysiloxane (A) and the curing catalyst (B) described above.

Since the composition of the present invention contains the organopolysiloxane of the present invention described above, when a solid substrate is coated with the organopolysiloxane, due to the structure of the organopolysiloxane of the present invention, the rapid curability, hardness, bending resistance, hydrophobicity, and water slipping properties of a cured coating are improved, as compared with the case of using a conventional organopolysiloxane.

The curing catalyst (B) is a component that accelerates the reaction in which the hydrolyzable silyl group contained in the organopolysiloxane (A) is hydrolytically condensed with moisture in the air to accelerate the curing of the composition, and is added for efficient curing.

An amount of the curing catalyst (B) added is not particularly limited, and is preferably 0.01 to 50 parts by weight, more preferably 0.05 to 10 parts by weight, and still more preferably 0.1 to 5 parts by weight per 100 parts by weight of the component (A) in consideration of preparing a cured film having desired physical properties by adjusting a curing rate to a suitable range, improving workability at the time of coating, and further economic efficiency accompanying addition.

The curing catalyst is not particularly limited as long as it is used for curing general moisture condensation cure compositions, and specific examples thereof include alkyl tin compounds such as dibutylin oxide and dioctyltin oxide; alkyl tin ester compounds such as dibutyltin diacetate, dibutyltin dilaurate, dibutyltin dioctoate, dioctyltin dioctoate, and dioctyltin diversatate; titanates, titanium chelate compounds and partial hydrolyzates thereof such as tetraisopropoxytitanium, tetra-n-butoxytitanium, tetrakis(2-ethylhexoxy)titanium, dipropoxybis(acetylacetonato)titanium, titanium diisopropoxybis(ethylacetoacetate), and titanium isopropoxyoctylene glycol; organometallic compounds such as zinc naphthenate, zinc stearate, zinc-2-ethyloctoate, iron-2-ethylhexoate, cobalt-2-ethylhexoate, manganese-2-ethylhexoate, cobalt naphthenate, aluminum trihydroxide, aluminum alcoholate, aluminum acylate, aluminum acylate salts, aluminosiloxy compounds, and aluminum chelate compounds; aminoalkyl-substituted alkoxysilanes such as 3-aminopropyltrimethoxysilane, 3-aminopropyltriethoxysilane, 3-aminopropylmethyldimethoxysilane, 3-aminopropylmethyldiethoxysilane, N-β(aminoethyl) γ-aminopropyltrimethoxysilane, N-β(aminoethyl) γ-aminopropyltriethoxysilane, N-β(aminoethyl) γ-aminopropylmethyldimethoxysilane, N-β(aminoethyl) γ-aminopropylmethyldiethoxysilane, bis[3-(trimethoxysilyl)propyl]amine, bis[3-(triethoxysilyl)propyl]amine, N,N'-bis[3-(trimethoxysilyl)propyl]ethane-1,2-diamine, N,N-bis[3-(triethoxysilyl)propyl]ethane-1,2-diamine, and N-phenyl-3-aminopropyltrimethoxysilane; amine compounds and salts thereof such as hexylamine, dodecylamine phosphate, and tetramethylguanidine; quaternary ammonium salts such as benzyltriethylammonium acetate, lower fatty acid salts of alkali metals such as potassium acetate, sodium acetate, and lithium oxalate; dialkylhydroxylamines such as dimethylhydroxylamine and diethylhydroxylamine; silanes and siloxanes having a guanidyl group such as tetramethylguanidylpropyltrimethoxysilane, tetramethylguanidylpropylmethyldimethoxysilane, tetramethylguanidylpropyltriethoxysilane, tetramethylguanidylpropylmethyldiethoxysilane, and tetramethylguanidylpropyltris(trimethylsiloxy)silane; and phosphazene base-containing silanes and siloxanes such as N,N,N',N',N'',N''-hexamethyl-N'''-[3-(trimethoxysilyl)propyl]-phosphorimidic triamide, which may be used alone or in admixture.

Among these, dioctyltin dilaurate, dioctyltin diversatate, tetraisopropoxytitanium, tetra-n-butoxytitanium, titanium diisopropoxybis(ethylacetoacetate), 3-aminopropyltrimethoxy silane, 3-aminopropyltriethoxy silane, N-β-(aminoethyl)-γ-aminopropyltrimethoxysilane, bis[3-(trimethoxysilyl)propyl]amine, N,N'-bis[3-(trimethoxysilyl)propyl]ethane-1,2-diamine, and tetramethylguanidylpropyltrimethoxysilane are preferable because of more excellent reactivity. From the viewpoint of the curability of the composition, dioctyltin dilaurate, dioctyltin diversatate, tetra-n-butoxytitanium, 3-aminopropyltrimethoxysilane, 3-aminopropyltriethoxysilane, and tetramethylguanidylpropyltrimethoxysilane are more preferable. From the viewpoint that the composition is free of organotin compounds and less toxic, tetra-n-butoxytitanium, 3-aminopropyltrimethoxysilane, 3-aminopropyltriethoxysilane, and tetramethylguanidylpropyltrimethoxysilane are still more preferable. From the viewpoint of curability of the composition, tetra-n-butoxytitanium and 3-aminopropyltriethoxy silane are particularly preferable.

For the purpose of improving workability by adjusting the viscosity of the composition of the present invention, or for the purpose of adjusting the curability of the composition, and the hardness, flexibility, and the like of a resulting coating film, one or two or more compounds selected from a silane compound optionally containing an alkoxysilyl group, a silicone alkoxy oligomer having an alkoxysilyl group and/or a silanol group in one molecule, and a silicone resin may be mixed separately from the organopolysiloxane as the component (A), depending on the intended use.

The silane compound containing an alkoxysilyl group is not particularly limited, and specific examples thereof include those exemplified for the alkoxysilanes (9) to (12).

The silicone alkoxy oligomer having an alkoxysilyl group and/or a silanol group in one molecule is not particularly limited, and may be a commercially available product. Specific examples thereof include X-40-9250, X-40-9246, X-40-9225, KR-500, KR-515, KC-89S, KR-401N, X-40-9227, KR-510, KR-9218, KR-400, X-40-2327, and KR-401, which are manufactured by Shin-Etsu Chemical Co., Ltd.

The silicone resin is not particularly limited, and may be commercially available. Specific examples thereof include KR-2201, KR-251, KR-112, KR-300, KR-311, KR-480, and KR-216 manufactured by Shin-Etsu Chemical Co., Ltd.

In addition, although the composition of the present invention is preferably in a solvent-free form substantially free of an organic solvent (often harmful to the human body and flammable), from the viewpoint of its use and workability, a solvent may also be added and used.

Here, "substantially" means that the solvent contained in the composition is 1 wt % or less, particularly 0.1 wt % or less.

Specific examples of the solvent that can be used include the same organic solvents as those used in the production of the organopolysiloxane (A).

The solvent also includes a solvent that is not a component intentionally added to the curable composition and the coating agent composition, such as a reaction solvent that cannot be completely removed by distillation wider reduced pressure.

Various additives such as an adhesion improver, an inorganic or organic ultraviolet absorber, a light stabilizer, a storage stability improver, a plasticizer, a filler, and a pigment may also be added to the composition of the present invention depending on the intended use.

The composition of the present invention described above is applied to a surface of the solid substrate and cured to form a coating layer, thereby obtaining a coated solid substrate which is a cured article.

The coating method is not particularly limited, and as specific examples thereof, the coating method may be selected as appropriate from well-known techniques such as spray coating, spin coating, dip coating, roller coating, brush coating, bar coating, and flow coating.

The solid substrate is not particularly limited, and specific examples include epoxy resins, phenolic resins, polycarbonates and polycarbonate blends, acrylic resins such as poly(methyl methacrylate), polyester resins such as poly(ethylene terephthalate), poly(butylene terephthalate), and unsaturated polyester resins, organic polymer substrates such as polyamide resins, polyimide resins, acrylonitrile-styrene copolymers, styrene-acrylonitrile-butadiene copolymer, polyvinyl chloride resins, polystyrene resins, blends of polystyrene and polyphenylene ether, cellulose acetate butyrate, and polyethylene resins; metal substrates such as a steel plate; paint-coated surfaces; glass; ceramics; concrete; slates; textiles; inorganic fillers such as wood, stone, tiles, (hollow) silica, titania, zirconia, and alumina; and glass fiber products such as glass fibers, glass clothes, glass tape, glass mat and glass paper. The material and shape of the substrate are not particularly limited, and the composition of the present invention can be particularly suitably used for coating a steel plate or glass.

When the composition of the present invention comes into contact with moisture in the atmosphere, the hydrolysis condensation reaction of the organopolysiloxane (A) proceeds, and the curing reaction starts. As the index of moisture in the atmosphere, any humidity in the range of RH 10% to 100% is acceptable, and moisture in the air is sufficient. However, in general, since faster hydrolysis takes place at a higher humidity, moisture may be added to the atmosphere if desired.

The temperature and time of curing reaction may appropriately vary depending on factors such as a substrate used, moisture concentration, catalyst concentration, and the type of hydrolyzable group. The curing reaction time is typically about 1 minute to about 1 week as long as the heat-resistant temperature of the substrate used is not exceeded.

Since the composition of the present invention cures well even at normal temperature, particularly when room temperature cure is essential for in-situ application or the like, the composition is excellent in workability because the coating surface becomes tack-free within several minutes to several hours. However, heat treatment within the range below which the substrate is heat resistant is acceptable.

EXAMPLES

Hereinafter, the present invention will be specifically described using Examples and Comparative Examples, but the present invention is not limited thereto.

In the following, the kinematic viscosity of each product is a measured value at 25° C. by a Cannon-Fenske viscometer measured by the method described in JIS Z 8803: 2011, and the molecular weight is a weight average molecular weight in terms of polystyrene determined by GPC measurement using a GPC (gel permeation chromatograph) apparatus manufactured by Tosoh Corporation, toluene as a solvent, and RI as a detector.

The average structure of the organopolysiloxane was calculated from integral values of detection spectra in $^1$H-NMR and $^{29}$Si-NMR by using a 300 MHz-NMR measurement device manufactured by JEOL Ltd.

The content (parts by weight, hereinafter referred to as silanol amount) of the silanolic hydroxyl group contained in each product was quantified from the amount of methane gas generated when a Grignard reagent (methylmagnesium iodide) was allowed to act on each product.

The content (mol/100 g, hereinafter referred to as vinyl value) of the vinyl group contained in each product was quantified by allowing a Hanus solution to act on each product, then reacting the product with an aqueous potassium iodide solution, and titrating generated iodine with sodium thiosulfate.

[1] Synthesis of Organopolysiloxane

Synthesis Example 1

Synthesis of Organopolysiloxane (1A)

A 5 L separable flask equipped with a stirrer, a reflux condenser, a dropping funnel, and a thermometer was charged with 1850 g (13.6 mol) of methyltrimethoxysilane, 300 g (1.8 mol) of methoxymethyltrimethoxysilane, 400 g (2.7 mol) of vinylmethyldimethoxysilane, and 0.7 g of maleic anhydride, 347 g of ion-exchanged water was added dropwise thereto at 15° C. under stirring, and the mixture was subjected to hydrolysis condensation at 70° C. for 3 hours. Then, 60 g of a strongly acidic cation exchange resin (Lewatit K 2629 manufactured by LANXESS) was added, and the mixture was further subjected to hydrolysis condensation at 70° C. for 3 hours. The obtained reaction solution was distilled off under normal pressure, and the condensation reaction was accelerated at 105° C. for 3 hours after the distillate stopped comes off. Finally, the distillate stopped was removed by distillation under reduced pressure (90° C., 1.3 kPa) to obtain an organopolysiloxane (1A) (yield: 1410 g). The obtained organopolysiloxane 1A was a colorless transparent liquid represented by the following average structural formula, and had a kinematic viscosity of 62 mm$^2$/s, a Mw of 2700, a silanol hydroxyl group content of 0.3 wt %, and a vinyl value of 15 mol/100 g.

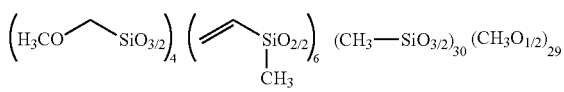
(1A)

Example 1-1

Synthesis of Organopolysiloxane (1B)

Into a 1 L separable flask equipped with a stirrer, a reflux condenser, a dropping funnel, and a thermometer, 200 g of the organopolysiloxane (1A) obtained in Example of synthesis 1, 95 g (reaction molar ratio, vinyl group:Si—H group=4:1) of the following hydrogen siloxane (8-1), and 180 g of toluene were charged, and under stirring, 0.0004 mol amount of a 1,3-divinyltetramethyldisiloxane complex of Pt(0) per 1 mol of the Si-H group was fed at 80° C., and hydrosilylated at 80° C. for 3 hours. Thereafter, the distillate stopped was removed by distillation under reduced pressure (90° C., 1.3 kPa) to obtain an organopolysiloxane (1B) (yield: 282 g). The obtained organopolysiloxane (1B) was a colorless transparent liquid represented by the following average structural formula, and had a kinematic viscosity of 635 mm$^2$/s, a Mw of 26400, and a silanol hydroxyl group content of 0.1 wt %.

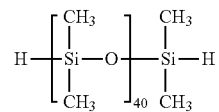
(8-1)

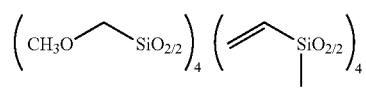
(1B)

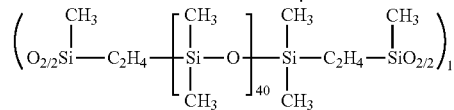

Example 1-2

Synthesis of Organopolysiloxane (1C)

Into a 1 L separable flask equipped with a stirrer, a reflux condenser, a dropping funnel, and a thermometer, 200 g of the organopolysiloxane (1A) obtained in Example of synthesis 1, 45 g (reaction molar ratio, vinyl group:Si—H group=4:1) of the following hydrogen siloxane (8-2), and 180 g of toluene were charged, and under stirring, 0.0004 mol amount of a 1,3-divinyltetramethyldisiloxane complex of Pt(0) per 1 mol of the Si—H group was fed at 80° C., and hydrosilylated at 80° C. for 3 hours. Thereafter, the distillate stopped was removed by distillation under reduced pressure (90° C., 1.3 kPa) to obtain an organopolysiloxane (1C) (yield: 240 g). The obtained organopolysiloxane (1C) was a colorless transparent liquid represented by the following average structural formula, and had a kinematic viscosity of 341 mm$^2$/s, a Mw of 17800, and a silanol hydroxyl group content of 0.1 wt %.

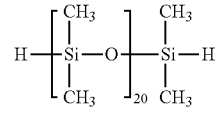
(8-2)

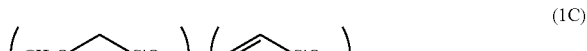
(1C)

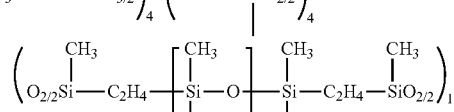

Example 1-3

Synthesis of Organopolysiloxane (1D)

Into a 1 L separable flask equipped with a stirrer, a reflux condenser, a dropping funnel, and a thermometer, 200 g of the organopolysiloxane (1A) obtained in Example of synthesis 1, 123 g (reaction molar ratio, vinyl group:Si—H group=4:1) of the following hydrogen siloxane (8-3), and 180 g of toluene were charged, and under stirring, 0.0004 mol amount of a 1,3-divinyltetramethyldisiloxane complex of Pt(0) per 1 mol of the Si—H group was fed at 80° C., and hydrosilylated at 80° C. for 3 hours. Thereafter, the distillate stopped was removed by distillation under reduced pressure (90° C., 1.3 kPa) to obtain an organopolysiloxane (1D) (yield: 313 g). The obtained organopolysiloxane (1D) was a colorless transparent liquid represented by the following average structural formula, and had a kinematic viscosity of 1329 mm/s, a Mw of 34300, and a silanol hydroxyl group content of 0.1 wt %.

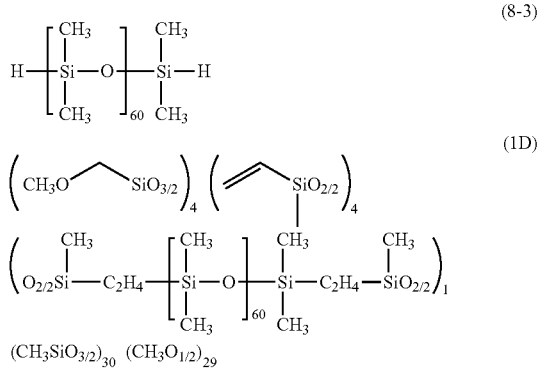

Example 1-4

Synthesis of Organopolysiloxane (1E)

Into a 1 L separable flask equipped with a stirrer, a reflux condenser, a dropping funnel, and a thermometer, 200 g of the organopolysiloxane (I A) obtained in Example of synthesis 1, 193 g (reaction molar ratio, vinyl group:Si—H group=4:1) of the following hydrogen siloxane (8-4), and 180 g of toluene were charged, and under stirring, 0.0004 mol amount of a 1,3-divinyltetramethyldisiloxane complex of Pt(0) per 1 mol of the Si—H group was fed at 80° C., and hydrosilylated at 80° C. for 3 hours. Thereafter, the distillate stopped was removed by distillation under reduced pressure (90° C., 1.3 kPa) to obtain an organopolysiloxane (1E) (yield: 385 g). The obtained organopolysiloxane (1E) was a colorless transparent liquid represented by the following average structural formula, and had a kinematic viscosity of 4714 mm$^2$/s, a Mw of 70000, and a silanol hydroxyl group content of 0.1 wt %.

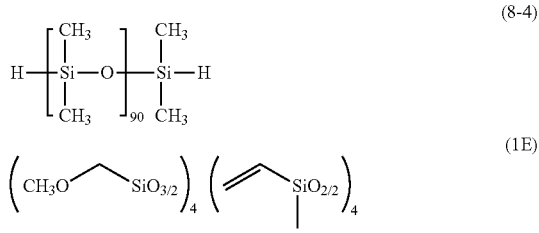

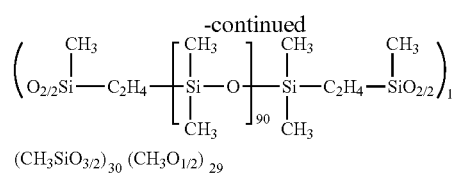

Synthesis Example 2

Synthesis of Organopolysiloxane (2A)

The 1 L separable flask equipped with a stirrer, a reflux condenser, dropping funnel, and a thermometer was charged with 370 g (3.08 mol) of methyltrimethoxysilane, 80 g (0.54 mol) of vinylmethyldimethoxysilane, and 0.14 g of maleic anhydride, 69.4 g of ion-exchanged water was added dropwise thereto at 15° C. under stirring, and the mixture was subjected to hydrolysis condensation at 70° C. for 3 hours. Then, 12 g of a strongly acidic cation exchange resin (Lewatit K 2629 manufactured by LANXESS) was added, and the mixture was further subjected to hydrolysis condensation at 70° C. for 3 hours. The obtained reaction solution was distilled off under normal pressure, and the condensation reaction was accelerated at 105° C. for 3 hours after the distillate stopped comes off Finally, the distillate stopped was removed by distillation under reduced pressure (90° C., 1.3 kPa) to obtain an organopolysiloxane (2A) (yield: 290 g). The obtained organopolysiloxane (2A) was a colorless transparent liquid represented by the following average structural formula, and had a kinematic viscosity of 66 mm$^2$/s, a Mw of 3100, a silanol hydroxyl group content of 0 wt %, and a vinyl value of 0.15 mol/100 g.

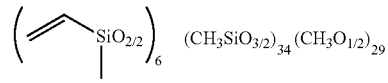

Comparative Example 1-1

Synthesis of Organopolysiloxane (2B)

Into a 1 L separable flask equipped with a stirrer, a reflux condenser, a dropping funnel, and a thermometer, 200 g of the organopolysiloxane (2A) obtained in Example of synthesis 2, 95 g (reaction molar ratio, vinyl group:Si—H group=4:1) of the above-described hydrogen siloxane (8-1), and 180 g of toluene were charged, and under stirring, 0.0004 mol amount of a 1,3-divinyltetramethyldisiloxane complex of Pt(0) per 1 mol of the Si—H group was fed at 80° C., and hydrosilylated at 80° C. for 3 hours. Thereafter, the distillate stopped was removed by distillation under reduced pressure (90° C., 1.3 kPa) to obtain an organopolysiloxane (2B) (yield: 290 g). The obtained organopolysiloxane (2B) was a colorless transparent liquid represented by the following average structural formula, and had a kinematic viscosity of 191 mm$^2$/s, a Mw of 13000, and a silanol hydroxyl group content of 0 wt %.

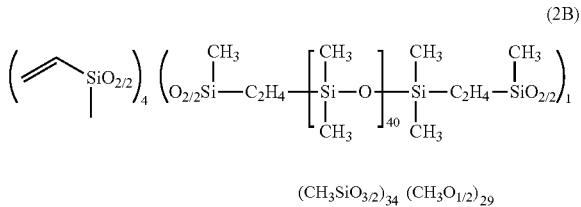

(2B)

$(CH_3SiO_{3/2})_{34}$ $(CH_3O_{1/2})_{29}$

[2] Coating Agent Composition

Examples 2-1 to 2-6, Comparative Examples 2-1 to 2-3, Reference Example 2-1

The organopolysiloxanes obtained in Examples 1-1 to 1-4 Comparative Example 1-1, and Example of synthesis 1 were mixed with a curing catalyst in compounding amounts shown in Table 1 to prepare coating agent compositions of Examples 2-1 to 2-6, Comparative Examples 2-1 to 2-3, and Reference Example 2-1.

became tack-free when the finger was pressed onto the coating surface was reported. A smaller value indicates better curability.

Pencil Hardness

A test piece obtained by forming a cured film on a glass plate by the above coating method was measured by applying a load of 750 g by a method according to a pencil scratch test described in JIS K 5600-5-4, and the results are shown.

Bending Resistance

A test piece obtained by forming a cured film on a polished steel sheet by the above coating method was measured using a cylindrical mandrel (type 1) according to a method described in JIS K 5600-5-1, and the results are shown.

Water Repellency/Lubricity

One drop (about 2 μl) of purified water was added dropwise to a test piece on which a cured film was formed on the polished steel sheet by the above coating method, and a water contact angle was measured using a contact angle meter (device name: Drop Master DM-701, manufactured by Kyowa Interface Science Co., Ltd.) to evaluate the water

TABLE 1

|  |  | Example | | | | | | Comparative Example | | | Reference Example |
|---|---|---|---|---|---|---|---|---|---|---|---|
|  |  | 2-1 | 2-2 | 2-3 | 2-4 | 2-5 | 2-6 | 2-1 | 2-2 | 2-3 | 2-1 |
| Organo- | 1B | 100 |  |  |  | 100 | 100 |  |  |  | 100 |
| polysiloxane | 1C |  | 100 |  |  |  |  |  |  |  |  |
|  | 1D |  |  | 100 |  |  |  |  |  |  |  |
|  | 1E |  |  |  | 100 |  |  |  |  |  |  |
|  | 2B |  |  |  |  |  |  | 100 |  |  |  |
|  | 1A |  |  |  |  |  |  |  | 100 |  |  |
|  | KR-400 |  |  |  |  |  |  |  |  | 100 |  |
| Curing | TBT | 2 | 2 | 2 | 2 |  |  | 2 | 2 |  |  |
| catalyst | KBE-903 |  |  |  |  | 2 |  |  |  |  |  |
|  | MGPM |  |  |  |  |  | 2 |  |  |  |  |

KR-400: Methyl-based silicone coating agent (manufactured by Shin-Etsu Chemical Co., Ltd.)
TBT: Tetrabutyl titanate
KBE-903: 3-Aminopropyltriethoxysilane
MGPM: Tetramethylguanidylpropyltrimethoxysilane Each coating agent composition obtained above was applied to a glass plate or a polished steel plate using a bar coater No. 14 under air at 25° C. and 50% RH, and dried and cured for 1 day under air at 25° C. and 50% RH to prepare a cured film. The obtained cured film was evaluated as follows. The results are shown in Table 2.

Tack-Free Time

A test piece obtained by coating the coating agent composition onto a glass plate by the above coating method was allowed to stand in air at 25° C. and 50% RH, during which moisture cure took place. The time taken until the coating repellency. A desirable value of the contact angle as the water repellency is approximately 1000 or more. Moreover, the same test piece to which one drop (approximately 20 μl) of purified water was added dropwise was gradually tilted from a horizontal state, and an angle at which the water drop started flowing was determined as a water sliding angle to evaluate the lubricity (water slipping properties). As the evaluation criteria, samples having a water sliding angle of less than 35° were evaluated as "○," samples having a water sliding angle of 35 to 450 were evaluated as "Δ," and samples having a water sliding angle of more than 45° were evaluated as "x."

TABLE 2

|  | Example | | | | | | Comparative Example | | | Reference Example |
|---|---|---|---|---|---|---|---|---|---|---|
|  | 2-1 | 2-2 | 2-3 | 2-4 | 2-5 | 2-6 | 2-1 | 2-2 | 2-3 | 2-1 |
| Tack-free time (min) | 10 | 10 | 10 | 10 | 10 | 5 | 20 | 20 | 20 | 60 or more |
| Pencil hardness | 6B | 5B | 6B | 6B | 5B | 3B | 6B or less | H | 2H | 6B or less |
| Bending resistance (mmφ) | 3 | 4 | 2 | 2 | 3 | 5 | 3 | 8 or more | 8 or more | 2 |

TABLE 2-continued

| | Example | | | | | | Comparative Example | | | Reference Example |
|---|---|---|---|---|---|---|---|---|---|---|
| | 2-1 | 2-2 | 2-3 | 2-4 | 2-5 | 2-6 | 2-1 | 2-2 | 2-3 | 2-1 |
| Water contact angle (Water repellency) | 102 | 100 | 102 | 104 | 102 | 103 | 100 | 92 | 86 | 90 |
| Water contact angle (Lubricity) | ○ | ○ | ○ | ○ | ○ | ○ | ○ | x | x | Δ |

Examples 3-1 to 3-6, Comparative Examples 3-1 to 3-3, Reference Example 3-1

The organopolysiloxanes obtained in Examples 1-1 to 1-4, Comparative Example 1-1, and Example of synthesis 1 were mixed with a curing catalyst in compounding amounts shown in Table 3 to prepare coating, agent compositions of Examples 3-1 to 3-6, Comparative Examples 3-1 to 3-3, and Reference Example 3-1.

TABLE 3

| | | Example | | | | | | Comparative Example | | | Reference Example |
|---|---|---|---|---|---|---|---|---|---|---|---|
| | | 3-1 | 3-2 | 3-3 | 3-4 | 3-5 | 3-6 | 3-1 | 3-2 | 3-3 | 3-1 |
| Organo-polysiloxane | 1B | 100 | | | | 100 | 100 | | | | 100 |
| | 1C | | 100 | | | | | | | | |
| | 1D | | | 100 | | | | | | | |
| | 1E | | | | 100 | | | | | | |
| | 2B | | | | | | | 100 | | | |
| | 1A | | | | | | | | 100 | | |
| | KR-400 | | | | | | | | | 100 | |
| Curing catalyst | TBT | 5 | 5 | 5 | 5 | | | 5 | 5 | | |
| | MGPM | | | | | 5 | | | | | |
| | DX9740 | | | | | | 5 | | | | |
| Solvent | Isopar G | 100 | 100 | 100 | 100 | 100 | 100 | 100 | 100 | 100 | 100 |

KR-400: Methyl-based silicone coating agent (manufactured by Shin-Etsu Chemical Co., Ltd.)
TBT: Tetrabutyl titanate
MGPM: Tetramethylguanidylpropyltrimethoxysilane
DX 9740: Aluminum alkoxide compound (manufactured by Shin-Etsu Chemical Co., Ltd.)
Isopar G: Isoparaffinic organic solvent (initial boiling point: 166° C., dry point: 177° C., manufactured by Exxon Mobil Corporation)

The following evaluations were performed using each coating agent composition obtained above. The results are shown in Table 4.

Constructability 2 ml of each of the above coating compositions was added dropwise to a black coated plate (material: SPCC-SD, standard: JIS-G-3141, dimension: 0.8 mm×70 mm×150 mm, one surface painted in black with an amino alkyd after chemical-electrodeposition, manufactured by Asahi-Betechno), thinly applied by hand using tissue paper, and allowed to stand at 25° C. for 5 minutes. Thereafter, the excessive composition was wiped with a dry microfiber cloth. At this time, if the wiping was performed lightly and uniformly the composition was evaluated as "○;" if the wiping was performed slightly non-uniformly or wiping resistance was slightly heavy, the composition was evaluated as "Δ;" and if unevenness occurred significantly or the wiping was heavy and construction was difficult were evaluated as "x."

Curability

A test piece coated with the coating composition was prepared in the same manner as in the evaluation of constructability. The test piece was further left standing at 25° C. for 2 hours and cured to obtain a test piece having a cured film. When a coating surface of the obtained test piece was touched with a finger, a sample in which no tack remained and slipperiness was exhibited was evaluated as "○," a sample in which no tack remained and slipperiness was not exhibited was evaluated as "Δ," and a sample in which tack remained was evaluated as "x."

Water Repellency/Lubricity

A test piece coated with the coating composition was prepared in the same manner as in the evaluation of constructability. The test piece was further left standing at 25° C. for 2 hours and cured to obtain a test piece having a cured film. One drop (about 2 μl) of purified water was added dropwise to the obtained test piece, and the water contact angle was measured using a contact angle meter (device name: Drop Master DM-701, manufactured by Kyowa Interface Science Co., Ltd.) to evaluate the water repellency. A desirable value of the contact angle as the water repellency is approximately 1000 or more. Moreover, the same test piece to which one drop (approximately 20 μl) of purified water was added dropwise was gradually tilted from a horizontal state, and an angle at which the water drop started flowing was determined as a water sliding angle to evaluate the lubricity (water slipping properties). As the evaluation criteria, samples having a water sliding angle of less than 35° were evaluated as "○," samples having a water sliding angle of 35 to 45° were evaluated as "Δ," and samples having a water sliding angle of more than 45° were evaluated as "x."

Abrasion Resistance

A test piece coated with the coating composition was prepared in the same manner as in the evaluation of constructability. The test piece was further left standing at 25° C. for 12 hours and cured to obtain a test piece having a cured film. The surface of the obtained test piece on which the cured film was prepared was subjected to an abrasion resistance test using a simple friction tester (manufactured by Imoto Machinery Co., Ltd.). Specifically, a moving plate to which the test piece was fixed was moved at a speed of 30 times per minute at a distance of 100 mm for one reciprocation, and a friction object to which a load of 500 g was applied by a weight was installed at the center and reciprocated 400 times to wear. The water contact angle of the surface after abrasion was measured in the same manner as in the water repellency/lubricity test, and the abrasion resistance was evaluated. In the evaluation of the abrasion resistance, a sample in which the water contact angle after 400 reciprocating motions was more than 90% of the water contact angle before wear was evaluated as "○," a sample in which the water contact angle was in a range of 75 to 90% was evaluated as "Δ," and a sample in which the water contact angle was less than 75% was evaluated as "x." The friction object used in the test is a dry clean cloth (water absorbing cloth made of cellulose/cotton composite fibers, a product "ThreeBond 6644E" of Three Bond Co., Ltd.) 40 mm in width containing distilled water and wound around a stainless cylinder 20 mm in diameter. The friction object was placed in such a manner that the axis of the cylinder was directed in a direction orthogonal to a moving direction of the moving plate.

TABLE 4

|  | Example | | | | | | Comparative Example | | | Reference Example |
| --- | --- | --- | --- | --- | --- | --- | --- | --- | --- | --- |
|  | 3-1 | 3-2 | 3-3 | 3-4 | 3-5 | 3-6 | 3-1 | 3-2 | 3-3 | 3-1 |
| Constructability | ○ | ○ | ○ | ○ | ○ | ○ | ○ | Δ | x | ○ |
| Curability | ○ | ○ | ○ | ○ | ○ | ○ | ○ | Δ | Δ | x |
| Water contact angle (Water repellency) | 102 | 100 | 102 | 104 | 102 | 103 | 100 | 92 | 86 | 90 |
| Lubricity | ○ | ○ | ○ | ○ | ○ | ○ | ○ | x | x | Δ |
| Abrasion resistance | ○ | ○ | ○ | ○ | ○ | ○ | Δ | x | Δ | x |

As shown in Tables 2 and 4, it is found that the coating agents using the organopolysiloxanes obtained in Examples 1-1 to 1-4 are excellent in rapid curability even when an anine-based compound is used as a curing catalyst, and the obtained cured film has both hardness and bending resistance, and is also excellent in water repellency and lubricity.

On the other hand, it is found that a coating agent using an organopolysiloxane having no constituent unit represented by the general formula (1) has a long tack-free time and is poor in fast curability, and the obtained cured film is poor in abrasion resistance.

In addition, it is found that a coating film obtained from a coating agent using an organopolysiloxane having no constituent unit represented by the general formula (2) is inferior in water repellency, lubricity, constructability, and abrasion resistance.

Japanese Patent Application No. 2021-069695 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method of producing an organopolysiloxane, comprising:

hydrosilylating a vinyl group-containing organopolysiloxane, obtained by copolymerizing a trialkoxysilane having the following general formula (6)

(6)

and a vinyl alkoxysilane having the following general formula (7)

(7)

by hydrolysis and condensation, and an organohydrogen polysiloxane having the following general formula (8):

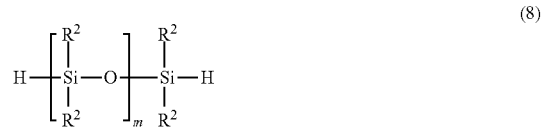

(8)

to produce an organopolysiloxane comprising a constituent unit having the following general formula (1), a constituent unit having the following general formula (2), and a group having the following general formula (3) that is directly bonded to a silicon atom,

(1)

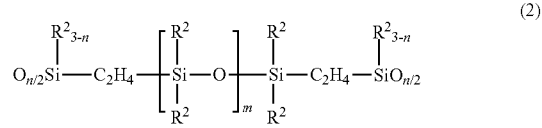

(2)

and $$R^3O— \qquad (3)$$

wherein $R^1$ represents an unsubstituted or substituted alkyl group having 1 to 12 carbon atoms or an unsubstituted or substituted aryl group having 6 to 10 carbon atoms, $R^2$ each independently represents an unsubstituted or substituted alkyl group having 1 to 12 carbon atoms or an unsubstituted or substituted aryl group having 6 to 10 carbon atoms, $R^3$ represents a hydrogen atom, an unsubstituted or substituted alkyl group having 1 to 10 carbon atoms, or an unsubstituted or substituted aryl group having 6 to 10 carbon atoms, and n is each independently 2 or 3, and m is an integer of 5 to 100.

* * * * *